United States Patent
Kindler et al.

(10) Patent No.: US 12,525,622 B2
(45) Date of Patent: Jan. 13, 2026

(54) SEPARATOR PLATE WITH WELD SECTIONS

(71) Applicant: Reinz-Dichtungs-GmbH, Neu-Ulm (DE)

(72) Inventors: Tobias Kindler, Staig (DE); Rainer Glueck, Dornstadt (DE); Bernadette Gruenwald, Ulm (DE); Horst Gehring, Orsenhausen (DE); Ahmet Oruc, Nantheim (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 649 days.

(21) Appl. No.: 18/061,785

(22) Filed: Dec. 5, 2022

(65) Prior Publication Data

US 2023/0178760 A1      Jun. 8, 2023

(30) Foreign Application Priority Data

Dec. 6, 2021   (DE) ..................... 20 2021 106 642.3

(51) Int. Cl.
*H01M 8/0265*   (2016.01)
*H01M 8/026*    (2016.01)
*H01M 8/0263*   (2016.01)

(52) U.S. Cl.
CPC ......... *H01M 8/0265* (2013.01); *H01M 8/026* (2013.01); *H01M 8/0263* (2013.01)

(58) Field of Classification Search
CPC .................................................. H01M 8/0265
See application file for complete search history.

(56) References Cited

U.S. PATENT DOCUMENTS

2019/0074525 A1* 3/2019 Tomana .............. H01M 8/0276

FOREIGN PATENT DOCUMENTS

| DE | 10248531 A1 | 4/2004 |
|---|---|---|
| DE | 202015104300 U1 | 8/2016 |
| DE | 112019005530 T5 | 8/2021 |
| DE | 202020103982 U1 | 10/2021 |
| WO | 2017046398 A1 | 3/2017 |

* cited by examiner

*Primary Examiner* — Brian R Ohara
(74) *Attorney, Agent, or Firm* — McCoy Russell LLP (57) ABSTRACT

Electrochemical systems comprising separator plates and the separator plates comprising a first individual plate and a second individual plate. The individual plate comprising: an electrochemically active region, at least one through-opening and a sealing bead. Conveying channels adjoin a bead flank of the sealing bead and the conveying channels connecting the through-opening and the sealing bead interior. A plurality of first weld sections connecting the two individual plates and the first weld sections extend in the direction of the first conveying channels and arranged between the first conveying channels.

16 Claims, 7 Drawing Sheets

SEPARATOR PLATE WITH WELD SECTIONS

CROSS-REFERENCE TO RELATED APPLICATION

The present application claims priority to German Utility Model Application No. 20 2021 106 642.3, entitled "SEPARATOR PLATE WITH WELD SECTIONS", filed on Dec. 6, 2021. The entire contents of the above-listed application is hereby incorporated by reference for all purposes.

TECHNICAL FIELD

The present disclosure relates to a separator plate for an electrochemical system. The electrochemical system may be, for example, a fuel cell system, an electrochemical compressor, a redox flow battery, or an electrolyzer.

BACKGROUND AND SUMMARY

Known electrochemical systems usually comprise a plurality of separator plates, which are arranged in a stack so that each two adjacent separator plates enclose an electrochemical cell. An electrochemical cell usually comprises a membrane, which is provided with electrodes and with a catalyst layer, and optionally gas diffusion layers facing towards the separator plates. For instance, the actual membrane is not formed over the entire surface of a separator plate, but instead extends substantially in the area that forms the electrochemically active region of the system. This is usually arranged substantially centrally and is surrounded by a frame. This frame is usually formed by an electrical insulator, for example a polymer-based film. The frame also has the task of electrically isolating adjacent separator plates from each other and thus avoiding a short-circuit. Besides the membrane, the electrodes and the catalyst layer(s), the membrane electrode assembly, hereinafter also abbreviated as MEA, also comprises the frame, which is sometimes also referred to as a reinforcing edge, but not the gas diffusion layer(s).

The separator plates usually each comprise two individual plates, which are connected to each other along their rear sides facing away from the electrochemical cells. The separator plates may serve, for example, for electrically contacting the electrodes of the individual electrochemical cells (for example fuel cells) and/or for electrically connecting adjacent cells (series connection of the cells). The separator plates may also be used to dissipate heat that is generated in the cells between the separator plates. Such waste heat may be generated, for example, during the conversion of chemical energy to electrical energy in a fuel cell. In the case of fuel cells, bipolar plates are often used as separator plates.

The separator plates or the individual plates of the separator plates usually each have at least one through-opening. In the separator plate stack of the electrochemical system, the through-openings of the stacked separator plates, which through-openings are arranged in an aligned or at least partially overlapping manner, then form media channels for supplying or discharging media. The through-openings are accordingly also formed in the frame of the membrane electrode assembly. For instance, the through-openings in the frame are formed with a smaller diameter than in the separator plates so that the resulting overhang of the frame isolates the adjacent separator plates from each other. In order to seal off the through-openings or the media channels formed by the through-openings of the separator plates, known separator plates also have bead arrangements, which are arranged in each case around the through-opening of the separator plate.

The individual plates of the separator plate may additionally have channel structures for supplying one or more media to an active region of the separator plate and/or for conveying media away therefrom. The active region may for example enclose or bound an electrochemical cell. By way of example, the media may be fuels (for example hydrogen or methanol), reaction gases (for example air or oxygen) or a coolant as supplied media, and reaction products and heated coolant as discharged media. In the case of fuel cells, the reaction media, e.g. fuel and reaction gases, are usually guided on the surfaces of the individual plates that face away from each other, while the coolant is guided between the individual plates.

The flanks of the bead arrangement arranged around the through-opening of the separator plate may have one or more apertures, as shown in DE 102 48 531 A1. These apertures serve to establish a fluid connection between the through-opening of the separator plate and the active region of the separator plate.

It is also known from document DE 102 48 531 A1 that the separator plate may additionally have one or more conveying channels, which adjoin the bead flank on an outer side of the bead arrangement and are in fluid connection with a bead interior of the bead arrangement. The supply of a medium from the through-opening, through the bead arrangement, to the electrochemically active region of the separator plate can take place in an even more targeted manner with the aid of such conveying channels. Such conveying channels may also assist the discharging of the medium from the electrochemically active region, through the bead arrangement, to the through-opening. Overall, therefore, the efficiency of the electrochemical system can be increased.

The aforementioned embodiments of conveying channels are therefore part of a fluid connection of the through-opening to the electrochemically active region and as such are provided only in a section of the bead arrangement; usually this section extends between the through-opening and the electrochemically active region. However, this asymmetrical design of the bead arrangement may lead to inhomogeneous bead compression in the stack, which in turn may lead to leaks in the stack or system.

A separator plate having conveying channels for fluidically connecting the through-openings to the electrochemically active region is also known from the publication WO 2017/046398 A1. The separator plate has two individual plates, which are connected to each other and have aligned through-openings for the passage of a fluid. The through-openings of both individual plates each have embossed inner edges around the circumference, which are spaced apart from each other and point away or diverge from each other. The conveying channel and the embossed inner edge have an equal height, measured perpendicular to a plate plane. Furthermore, the embossed inner edges of the through-opening form a wide access to the inlet and/or outlet of the actual conveying channel.

These embossed inner edges are on the one hand advantageous with regard to forming the conveying channels and punching out or cutting the through-openings in one plane. On the other hand, however, the diverging inner edges pose a risk of short-circuits. When the individual plates are pushed even further apart due to the compression force of the sealing bead in the stack and the associated lever effect on the inner edge, adjacent separator plates may damage the overhang of the frame of the membrane electrode assembly, which is located therebetween, or may possibly even perforate it or cause relatively large cracks therein, and as a result in some circumstances may even make contact with each other through the resulting openings, which may lead to a short-circuit. In order to solve or alleviate this problem, the height of the sealing bead can be increased, while maintaining the height of the embossed inner edges. At the same time, however, a smallest possible height of the bead arrangement is advantageous for minimizing the size of the separator plate stack or accommodating more cells while keeping the same height of the separator plate stack. Furthermore, if the bead height is increased, this would require an adjustment of many other parameters of the overall system, for example including in the electrochemically active region, which is impossible or very difficult to implement in practice.

The object of the present disclosure is therefore to provide a separator plate for an electrochemical system that at least partially solves the problems mentioned above.

This object is achieved by embodiments of a separator plate for an electrochemical system discussed herein.

Accordingly, a separator plate for an electrochemical system is proposed. The separator plate comprises a first individual plate and a second individual plate, which are connected to each other, wherein at least the first individual plate comprises:

an electrochemically active region,
at least one through-opening for the passage of a fluid, having an inner edge that bounds the through-opening,
a sealing bead arranged around the through-opening for sealing off the through-opening, wherein the sealing bead has a sealing bead interior, a first bead flank facing towards the through-opening, and a second bead flank,
a plurality of first conveying channels, which adjoin the first bead flank of the sealing bead, are in fluid connection with the sealing bead interior and extend from the sealing bead in the direction of the through-opening, wherein the through-opening and the sealing bead interior are fluidically connected to each other via the first conveying channels, and
a plurality of first weld sections for connecting the two individual plates, which first weld sections extend substantially parallel to the conveying channels and are arranged in each case between the first conveying channels.

As a result of the first weld sections, the individual plates bear against each other in the inner edge region of the separator plate, thereby preventing any diverging of the individual plates in this region of the separator plate. The risk of a short-circuit and/or damage to individual components during operation of the electrochemical system can thus be reduced.

In the context of this specification, a fluid connection or a fluidic connection may be a direct connection without intermediate elements or an indirect connection by way of additional intermediate elements. A fluidic connection from the through-opening, via first conveying channels, a sealing bead and optionally second conveying channels, to a distribution and/or collection region or an electrochemically active region is sometimes referred to as a bead passage. A bead passage usually does not occur singly, but rather groups of bead passages are formed in the region of a sealing bead.

In the context of this specification, substantially parallel encompasses deviations of up to 25°, as well as deviations from a straight line over at most 15% of the length of a weld section, and curved weld sections having an extension in the width direction that is less than 15% of the extension in the parallel direction.

The first weld sections are often at a smaller distance from the inner edge than from the sealing bead, for instance a nearest bead foot of the sealing bead. It may be provided that an end of the respective first weld section facing towards the inner edge reaches closer to the edge than an end of the respective first weld section facing away from the inner edge reaches to a nearest bead foot of the sealing bead.

For instance, the inner edges of the through-opening of the two individual plates are congruent at least in part, for instance in the region of the first conveying channels and/or bead passages. However, they may also have a minimal offset relative to each other. If the two inner edges have an offset relative to each other, the inner edge of the individual plate that is set further back at the point under consideration is regarded in each case as the inner edge of the through-opening of the separator plate as a whole.

The end of the respective first weld section facing towards the nearest bead foot is sometimes at a distance from the bead foot of no less than 0.2 mm, no less than 0.3 mm, or no less than 0.4 mm. Conversely, in other embodiments, the maximum distance of the respective first weld section from the nearest bead foot is at most 1 mm, at most 0.75 mm, or at most 0.5 mm.

The first weld sections usually reach to the inner edge. However, the first weld sections do not have to reach to the inner edge, for instance if the maximum distance of the respective first weld section from the inner edge is at most 1 mm, at most 0.75 mm, at most 0.5 mm or 0.25 mm.

It may be provided that at least two of the first weld sections are arranged between two adjacent first conveying channels. The number of first weld sections between adjacent conveying channels may depend on the distance between these conveying channels. If a minimum distance between two adjacent conveying channels is relatively large, it may be advantageous to provide a plurality of first weld sections in order to reduce the extent of divergence of the individual plates in this region.

A region of the separator plate extending between two adjacent first conveying channels may comprise three sub-regions, which extend parallel to the first conveying channels. The three sub-regions may comprise a first lateral sub-region, a second middle sub-region, and a third lateral sub-region, wherein the lateral sub-regions typically adjoin the first conveying channels. The first weld sections may in each case be arranged in the middle sub-region or alternatively or additionally in at least one of the two lateral sub-regions.

A length of the first weld sections—e.g. a length of each of the first weld sections—may be, for example, greater than 1.0, greater than 1.5 mm, or greater than 2.0 mm. In addition, a width of the first weld sections—e.g. a width of each of the first weld sections—may be, for example, in the range 20 µm-200 µm. In relation to the distance between the inner edge and the first nearest bead foot, the length of the first weld sections is at least ¼, at least ⅓, and for instance at least 40%. The distances between the ends of the first weld sections and the nearest bead foot or the inner edge may be at most ⅓, or at most ¼ of the distance between the inner edge and the nearest bead foot.

The separator plate may additionally have a plurality of second weld sections for connecting the two individual plates. The second weld sections are usually arranged at an angle, such as perpendicularly, to the first weld sections and are arranged in each case between the first conveying channels. An angle between the respective first weld section and the second weld section is, for example, 70° or more and/or 110° or less. Shorter, rounded transitions are also possible, for instance over at most 15% of the total length of the first and second weld section.

The second weld sections are usually arranged in the same sections between the first conveying channels as the first weld sections. It may be provided that at least one of the second weld sections crosses one of the first weld sections and/or adjoins one of the first weld sections. Optionally, at least two second weld sections are arranged between two adjacent first conveying channels. At least one of the first weld sections and at least one of the second weld sections may together form a T-shaped, +-shaped, L-shaped, rectangularly shaped or H-shaped or substantially U-shaped or C-shaped weld. The orientation of the overall structure formed of first and second weld sections can be varied for the aforementioned shapes within the framework of the substantially parallel orientation of the first weld sections relative to the first conveying channels and can be adapted to the available space or to the given situation.

A minimum distance of the second weld sections from the inner edge may be in each case at least 0.2 mm, or 0.3 mm.

The respective first weld sections and/or the second weld sections may comprise laser-welded joints.

The number of first weld sections may be greater than or less than or equal to the number of first conveying channels. The number of second weld sections may be greater than or less than or equal to the number of first conveying channels and/or the number of first weld sections.

The first conveying channels may be oriented at an angle to the inner edge and/or to the sealing bead, such as at an angle of at least 60° and/or at most 120°, for instance around 90°.

In one embodiment, the separator plate comprises a weld for connecting the individual plates. The weld is often arranged around the sealing bead on a side of the sealing bead remote from the through-opening. For example, the weld may be formed around a through-opening for a reaction gas. The weld may be designed as a continuous weld or as a stitch weld. The design of the weld may depend on the type of through-opening. For example, if the through-opening is designed for the passage of a reaction medium, such as a reaction gas, the weld may be designed as a continuous weld. In this case, besides the function of connecting the two individual plates, the weld also has a sealing function and is intended to prevent cooling media and reaction media from mixing with each other. If the through-opening is designed for the passage of a coolant, such as a cooling fluid, the weld may be designed as a series of individual, spaced-apart weld sections. In this case, the cooling fluid may be able to flow between the two individual plates and through the weld. The weld may also advantageously be omitted in this case. The weld may be designed as a laser weld, regardless of the shape of the line.

The separator plate may also comprise a plurality of second conveying channels, which adjoin the second bead flank of the sealing bead and are in fluid connection with the sealing bead interior. The electrochemically active region and the sealing bead interior may be fluidically connected to each other via the second conveying channels. Each of the second conveying channels may be fluidically connected to the electrochemically active region via an aperture formed in the separator plate, such as an aperture formed in the first individual plate. This embodiment may be advantageous when the through-opening is designed for the passage of a reaction medium. The number of second conveying channels may be greater than or equal to the number of first conveying channels. In principle, it is also conceivable to form a smaller number of second conveying channels than first conveying channels.

For example if, at least for one medium, such as for the coolant, the second conveying channels open directly into the distribution and/or collection region and are thus fluidically connected to the active region on the inner side of the separator plate. An aperture may not be provided for this medium.

Optionally, the second conveying channels are oriented at an angle to the weld and/or to the sealing bead, such as at an angle of at least 60° and/or at most 120°, for instance around 90°.

The at least one aperture may be designed as a cutout and/or a punched hole in the plate in question.

If a bead, e.g. the sealing bead, is formed not with a trapezoidal or trough-shaped cross-section, but rather with a much more pronouncedly curved cross-section, then what has been stated above (and/or below) in relation to the different bead flanks generally applies to the respective outer third(s) of a bead curve.

The second individual plate may at least in part have the same features as the first individual plate, but the apertures in the first individual plate may be provided at different through-openings than in the second individual plate and, for example, the distribution and collection regions may also be differently designed. The separator plate may thus be constructed in a mirror-symmetrical manner at least in some regions, such as in the region of the bead and the first conveying channels, wherein the mirror plane extends parallel to a flat plate plane of the separator plate and between the two individual plates.

The sealing bead may have at least in part a wavy, curved, round or straight course. The bead flanks of the sealing bead are often shaped in a complementary manner, e.g. if the first bead flank is convex in one section, the second bead flank is concave in this section, and vice versa.

In one embodiment, the sealing bead has at least in part a wavy course, wherein the wavy course has a plurality of wave periods with convex and concave sections, which in each case merge into each other at a turning point. The respective weld sections may for example in each case face towards a concave section of the sealing bead and/or a convex section and/or a turning point of the sealing bead.

The conveying channels (first and/or second) may for example adjoin the turning points, the concave sections or the convex sections of the sealing bead. It may happen that the first conveying channels adjoin a concave section of the sealing bead, while the second conveying channels adjoin a convex section of the sealing bead, or vice versa. It is also possible that both the first conveying channels and the second conveying channels adjoin concave sections or convex sections, so that the first and second conveying channels are arranged offset relative to each other in relation to the course of the sealing bead.

The sealing bead, the inner edge and/or the weld may extend at least in part parallel to each other. In addition or as an alternative, the main directions of extension of the sealing bead, the inner edge and/or the weld may extend at least in part parallel to each other.

As indicated above, the through-opening may be designed for the passage of a reaction medium, such as a reaction gas, or a coolant, such as a cooling fluid. A through-opening may form a feed opening or a discharge opening.

Also proposed is an electrochemical system comprising a plurality of stacked separator plates of the type described above.

Exemplary embodiments of the separator plate and of the electrochemical system are shown in the figures and will be explained in greater detail on the basis of the following description.

DETAILED DESCRIPTION

Here and below, features that recur in different figures are denoted by the same or similar reference signs.

Figure 1:
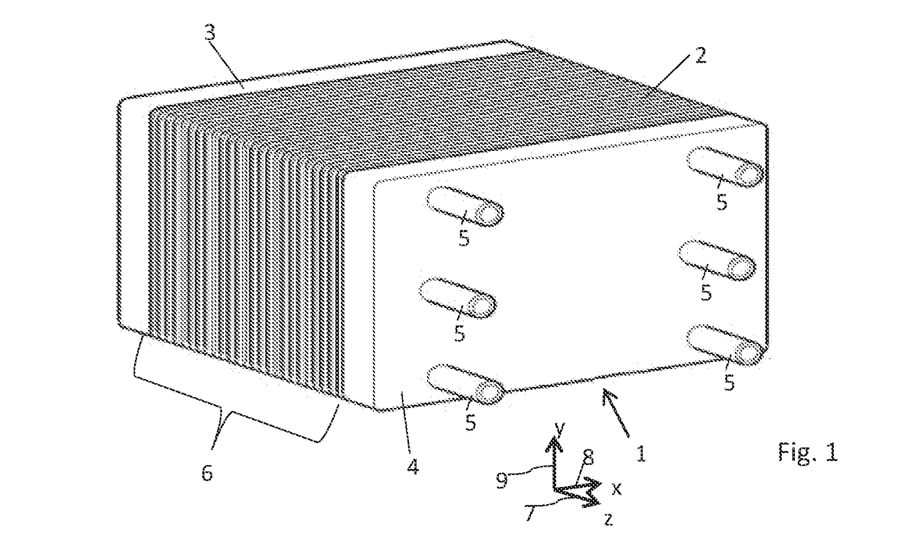
FIG. 1 schematically shows, in a perspective view, an electrochemical system comprising a plurality of separator plates or bipolar plates arranged in a stack.

FIG. 1 shows an electrochemical system 1 comprising a plurality of structurally identical metal separator plates 2, which are arranged in a stack 6 and are stacked along a z-direction 7. The separator plates 2 of the stack 6 are usually clamped between two end plates 3, 4. The z-direction 7 is also referred to as the stacking direction. In the present example, the system 1 is a fuel cell stack. Each two adjacent separator plates 2 of the stack thus bound an electrochemical cell, which serves for example to convert chemical energy into electrical energy. To form the electrochemical cells of the system 1, a membrane electrode assembly (MEA) 10 is arranged in each case between adjacent separator plates 2 of the stack (see, for example, FIG. 2). Each MEA 10 typically contains at least one membrane, for example an electrolyte membrane. Furthermore, a gas diffusion layer (GDL) may be arranged on one or both surfaces of the MEA. The MEA 10 often additionally comprises a frame-like reinforcing layer, which frames the electrolyte membrane and reinforces it. The reinforcing layer is usually electrically insulating and prevents a short-circuit from occurring during operation of the electrochemical system 1.

In alternative embodiments, the system 1 may also be designed as an electrolyser, as an electrochemical compressor, or as a redox flow battery. Separator plates can likewise be used in these electrochemical systems. The structure of these separator plates may then correspond to the structure of the separator plates 2 explained in detail here, although the media guided on and/or through the separator plates in the case of an electrolyzer, an electrochemical compressor or a redox flow battery may differ in each case from the media used for a fuel cell system.

The z-axis 7, together with an x-axis 8 and a y-axis 9, spans a right-handed Cartesian coordinate system. The separator plates 2 each define a plate plane, each of the plate planes of the separator plates being oriented parallel to the x-y plane and thus perpendicular to the stacking direction or to the z-axis 7. The end plate 4 usually has a plurality of media ports 5, via which media can be supplied to the system 1 and via which media can be discharged from the system 1. Said media that can be supplied to the system 1 and discharged from the system 1 may comprise for example fuels such as molecular hydrogen or methanol, reaction gases such as air or oxygen, reaction products such as water vapor or depleted fuels, or coolants such as water and/or glycol.

Figure 2:
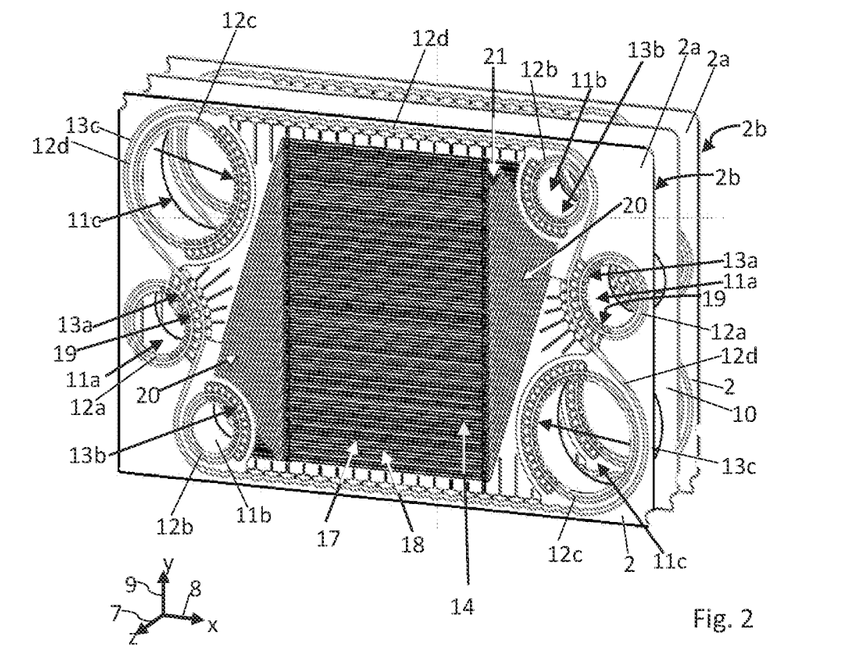
FIG. 2 schematically shows, in a perspective view, two bipolar plates of the system according to FIG. 1 with a membrane electrode assembly (MEA) arranged between the bipolar plates.

Both known separator plates, as shown in FIG. 2, and separator plates according to the present disclosure, as shown from FIG. 3 onwards, can be used in an electrochemical system as shown in FIG. 1.

FIG. 2 shows, in a perspective view, two adjacent separator plates 2 of an electrochemical system of the same type as the system 1 from FIG. 1, as well as a membrane electrode assembly (MEA) 10 which is arranged between these adjacent separator plates 2. The MEA 10 in FIG. 2 being largely screened by the separator plate 2 facing towards the viewer. Embodiments of the separator plate 2 is formed of two individual plates 2a, 2b which are joined together in a materially bonded manner (see also, for example, FIGS. 8, 9, 13, 14), of which only the first individual plate 2a facing towards the viewer is visible in FIG. 2, said first individual plate obscuring the second individual plate 2b. The individual plates 2a, 2b may each be manufactured from a metal sheet, for example from a stainless-steel sheet. The individual plates 2a, 2b may for example be welded to each other along their outer edge, for example by laser-welded joints.

The individual plates 2a, 2b typically have through-openings, which are aligned with one another and form through-openings 11a-c of the separator plate 2. When a plurality of separator plates of the same type as the separator plate 2 are stacked, the through-openings 11a-c form lines which extend through the stack 6 in the stacking direction 7 (see FIG. 1). Typically, each of the lines formed by the through-openings 11a-c is fluidically connected to one of the ports 5 in the end plate 4 of the system 1. For example, coolant can be introduced into the stack 6 via the lines formed by the through-openings 11a, while the coolant can be discharged from the stack via other through-openings 11a. In contrast, the lines formed by the through-openings 11b, 11c may be designed to supply fuel and reaction gas to the electrochemical cells of the fuel cell stack 6 of the system 1 and to discharge the reaction products from the stack. The media-guiding through-openings 11a-c are substantially parallel to the plate plane.

In order to seal off the through-openings 11a-c with respect to the interior of the stack 6 and with respect to the surrounding environment, the first individual plates 2a may each have sealing arrangements in the form of sealing beads 12a-c, which are in each case arranged around the through-openings 11a-c and in each case completely surround the through-openings 11a-c. On the rear side of the separator plates 2, facing away from the viewer of FIG. 2, the second individual plates 2b have corresponding sealing beads for sealing off the through-openings 11a-c (not shown).

In an electrochemically active region 18, the first individual plates 2a have, on the front side thereof facing towards the viewer of FIG. 2, a flow field 17 with first structures 14 for guiding a reaction medium along the outer side (or also front side) of the individual plate 2a. In FIG. 2, these first structures 14 are defined by a plurality of webs and by channels extending between the webs and delimited by the webs. On the front side of the separator plate 2, facing towards the viewer of FIG. 2, the first individual plates 2a additionally each have a distribution and/or collection region 20. The distribution and/or collection region 20 comprises structures 21 which are designed to distribute over the active region 18 a medium that is introduced from a first of the two through-openings 11b into the adjoining distribution region 20 and to collect or to pool a medium flowing towards the second of the through-openings 11b from the active region 18 via the collection region 20. In FIG. 2, the distributing structures 21 of the distribution and/or collection region 20 are likewise defined by webs and by channels extending between the webs and delimited by the webs.

The sealing beads 12a-12c have conveying channels 13a-13c, of which the conveying channels 13a are formed both on the underside of the upper individual plate 2a and on the upper side of the lower individual plate 2b, while the conveying channels 13b are formed in the upper individual plate 2a and the conveying channels 13c are formed in the lower individual plate 2b. By way of example, the conveying channels 13a enable coolant to pass between the through-opening 12a and the distribution and/or collection region 20, so that the coolant enters the distribution and/or collection region 20 between the individual plates 2a, 2b and is guided out therefrom.

Furthermore, the conveying channels 13b enable hydrogen to pass between the through-opening 12b and the distribution or collection region on the upper side of the upper individual plate 2a; these conveying channels 13b adjoin apertures which face towards the distribution or collection region and which extend at an angle to the plate plane. Hydrogen, for example, thus flows through the conveying channels 13b and the apertures from the through-opening 12b to the distribution or collection region on the upper side of the upper individual plate 2a, or in the opposite direction. The conveying channels 13c enable air, for example, to pass between the through-opening 12c and the distribution or collection region, so that air enters the distribution or collection region on the underside of the lower individual plate 2b and is guided out therefrom. The associated apertures are not visible here.

The first individual plates 2a each also have a further sealing arrangement in the form of a perimeter bead 12d, which extends around the flow field 17 of the active region 18 and also around the distribution and/or collection region 20 and the through-openings 11b, 11c and seals these off with respect to the through-openings 11a, that is to say with respect to the coolant circuit, and with respect to the environment surrounding the system 1. The second individual plates 2b each comprise corresponding perimeter beads 12d. The structures of the active region 18, the distributing or collecting structures of the distribution and/or collection region 20 and the sealing beads 12a-d are each formed in one piece with the individual plates 2a and are integrally formed in the individual plates 2a, for example in an embossing, hydroforming or deep-drawing process. The same applies to the corresponding distributing structures and sealing beads of the second individual plates 2b. Each sealing bead 12a-12d may have in cross-section at least one bead top and two bead flanks, but a substantially angular arrangement between these elements is not necessary; a curved transition may also be provided, e.g. arcuate beads are also possible.

While the sealing beads 12a-12c in the example of FIG. 2 have a substantially round course, the perimeter bead 12d has various sections that are shaped differently. For instance, the course of the perimeter bead 12d may include at least two wavy sections.

The two through-openings 11b or the lines through the plate stack of the system 1 that are formed by the through-openings 11b are in each case in fluid connection with each other via conveying channels 13b in the sealing beads 12b, via the distributing structures of the distribution or collection region 20 and via the flow field 17 in the active region 18 of the first individual plates 2a facing towards the viewer of FIG. 2. Analogously, the two through-openings 11c or the lines through the plate stack of the system 1 that are formed by the through-openings 11c are in each case in fluid connection with each other via corresponding conveying channels, via corresponding distributing structures and via a corresponding flow field on an outer side of the second individual plates 2b facing away from the viewer of FIG. 2. To this end, respective channel structures 14 for guiding the relevant media are provided in the active regions 18.

In contrast, the through-openings 11a or the lines through the plate stack of the system 1 that are formed by the through-openings 11a are in each case in fluid connection with each other via a cavity 19 which is surrounded or enclosed by the individual plates 2a, 2b. This cavity 19 serves in each case to guide a coolant through the bipolar plate 2, such as for cooling the electrochemically active region 18 of the separator plate 2. The coolant thus serves primarily to cool the electrochemically active region 18 of the separator plate 2. The coolant flows through the cavity 19 from an inlet opening 11a towards an outlet opening 11a. Mixtures of water and antifreeze are often used as coolants. However, other coolants are also conceivable. Channel structures present on the inner side of the separator plate 2 may help guide the coolant or cooling medium. These are not visible in FIG. 2 since they extend, for example, on the surface of the individual plate 2a facing away from the viewer; they are therefore situated opposite the above-mentioned channel structures 14 on the other surface of the individual plate 2a. In the active region 18, the channel structures guide the cooling medium along the inner side of the separator plate towards the outlet opening 11a.

While FIG. 2 shows a separator plate in which the perimeter bead does not enclose the through-openings 11a, e.g. the perimeter bead is crossed by conveying channels 13a, designs of separator plates are also possible in which the through-openings 11a are enclosed by the perimeter bead in the same way as the other through-openings 11b, 11c, so that no such crossing is necessary.

Figure 3A:
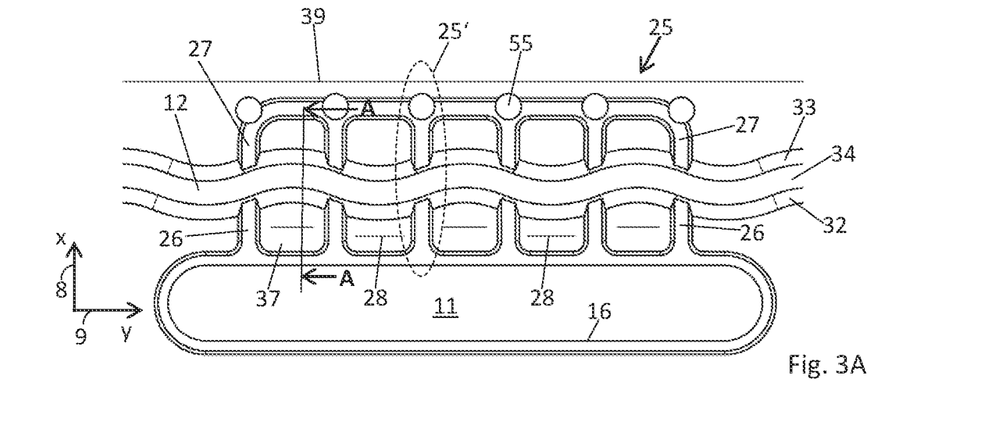
FIG. 3A shows a group of bead passages of a separator plate according to the prior art, in a plan view.
Figure 3B:
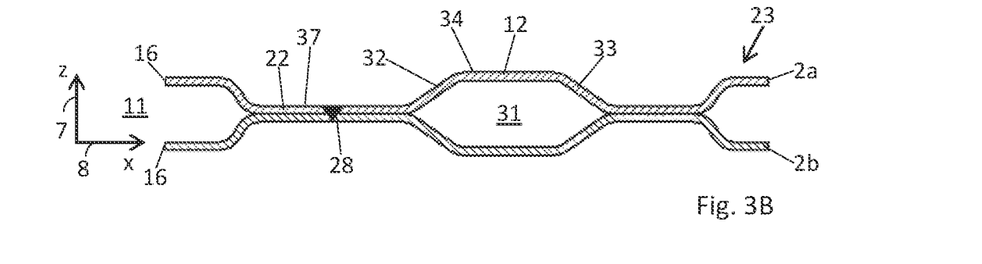
FIG. 3B shows a sectional view between two bead passages of FIG. 3A in a non-compressed state of the separator plate.
Figure 3C:
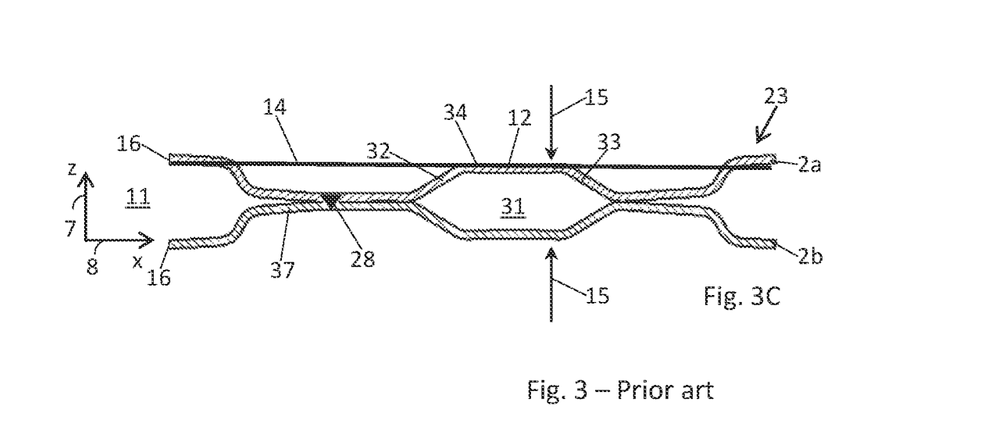
FIG. 3C shows a sectional view between two bead passages of FIG. 3A in a compressed state of the separator plate.

FIG. 3 comprises sub-figures 3A-3C and shows a further separator plate 2 according to the prior art. Hereinbelow, the through-opening 11 can represent one of the above-mentioned through-openings 11a-11c.

FIG. 3A shows, in a plan view, the region around a through-opening 11 of a separator plate 2 with bead passages 25 not according to the present disclosure. For instance, each bead passage 25 shown in FIG. 3A has conveying channels 26, 27 of constant height and constant width. The supplying of a medium from the through-opening 11, through the sealing bead 12, to the electrochemically active region 18 of the separator plate 2 can take place in a targeted manner with the aid of such conveying channels 26, 27. Such conveying channels 26, 27 can also help the discharging of the medium from the electrochemically active region 18, through the bead arrangement 12, to the through-opening 11.

FIGS. 3B, 3C show two sectional views between two bead passages 25 according to FIG. 3A, the section plane being perpendicular to the flat surface plane of the separator plate 2. The section plane extends along the straight line A-A marked in FIG. 3A.

The diagram in FIG. 3B shows the region 37 adjacent to the bead passage 25 in the non-compressed state of the separator plate 2.

The diagram in FIG. 3C shows the section in the compressed state of the separator plate, wherein a force exerted on the bead arrangement 12 perpendicular to the flat surface plane of the separator plate 2 or perpendicular to the flat surface plane of the individual plates 2a, 2b is marked by arrows 15. The force arises as a result of the separator plates 2 and membrane electrode assembles 10 in the stack 6 being compressed between the end plates 3, 4.

The through-opening 11 of the separator plate 2 is formed by aligned or at least partially overlapping through-openings of the two individual plates 2a, 2b. The through-openings of the individual plates 2a, 2b each have embossed inner edges 16 around the circumference, which point away from each other and are spaced apart from each other. An inlet and/or outlet of a conveying channel 26, which points towards the through-opening 11, is formed on the embossed inner edge 16 of the through-opening, the conveying channel 26 and the embossed inner edge 16 having an equal height, measured perpendicular to a flat surface plane (plate plane) of the separator plate 2.

These embossed inner edges 16, or more specifically the embossed regions that directly adjoin the inner edges 16, are on the one hand advantageous with regard to forming the conveying channels 26 and punching out or cutting the through-openings 11 in one plane. On the other hand, however, the spaced-apart inner edges 16 pose a risk of short-circuits, such as when the individual plates 2a, 2b diverge even further from each other due to the compression force on the sealing bead 12 in the stack 6 and the associated lever effect on the inner edge 16, as a result of which adjacent separator plates 2 may damage or destroy the reinforcing edge (not shown here) of the MEA and in the worst case may make contact with each other through the resulting openings and thus may form a short-circuit. It can therefore be seen from the diagram in FIG. 3C that, when compressed, the individual plates 2a, 2b diverge away from each other in regions 21, 23 spaced apart from the sealing bead 12, so that the individual plate 2a partially projects beyond the height 24 of the sealing bead 12 in the regions 21, 23. In this case, for example, the membrane electrode assembly 10 arranged between adjacent separator plates of the stack 2, such as the frame-like reinforcing layer, may be damaged.

In FIGS. 3B and 3C, welded joints 28 are formed between the individual plates 2a, 2b of the separator plate 2 in order to connect the plates 2a, 2b in a materially bonded manner, see also FIG. 3A. As shown in FIGS. 3A-3C, on a side of the sealing bead 12 facing towards the active region 18, a continuous weld line 28 is formed between the two individual plates 2a, 2b of the separator plate 2 in the region of the conveying channels 27. The disadvantageous lever effect and the divergence of the individual plates 2a, 2b is thus somewhat smaller on a side of the sealing bead 12 facing towards the active region 18 than on the side of the sealing bead 12 facing towards the through-opening 11. The divergence of the individual plates 2a, 2b in the regions 21, 23 during compression of the bead arrangement 12 can thus be reduced as a result of the materially bonded connection 28. However, the lever force exerted on the region 21 as a result of the compression of the sealing bead 12 continues to be so great, even in the region 21 on the side of the sealing bead 12 facing towards the through-opening 11, that the individual plate 2a partially projects beyond the height 24 of the bead arrangement 12 in the region 21.

The present disclosure has been designed to at least partially solve the problems mentioned above.

The separator plates 2 of the embodiments in FIGS. 4-14 share the common feature that at least one, but both, of the individual plates 2a, 2b may have at least one through-opening 11 for the passage of a fluid, having an inner edge 16 that bounds the through-opening. A sealing bead 12 arranged around the through-opening 11 is provided for sealing off the through-opening 11, wherein the sealing bead 12 has a sealing bead interior 31, a first bead flank 32 facing towards the through-opening 11, and a second bead flank 33. A bead top 34 may extend between the bead flanks 32, 33. The bead top 34 may be provided with a coating, for example a polymer-based coating to assist the sealing function of the sealing bead 12.

In order to convey the corresponding fluid from the through-opening 11, through the bead 12, to the electrochemically active region 18, or from the electrochemically active region 18, through the bead 12, to the through-opening 11, a group 25 of bead passages 25' is provided. To this end, a plurality of first conveying channels 26 are provided, which adjoin the first bead flank 32 of the sealing bead 12. The first conveying channels 26 are in fluid connection with the sealing bead interior 31, extend from the sealing bead 12 in the direction of the through-opening 11, and are fluidically connected to the through-opening 11. The first conveying channels 26 form elevations on the respective plate 2a, 2b, as a result of which the fluid can flow from the through-opening 11 to the sealing bead interior 31 and from the sealing bead interior 31 to the through-opening 11. The through-opening 11 and the sealing bead interior 31 are therefore fluidically connected to each other via the first conveying channels 26.

The individual plates 2a, 2b are connected to each other in a materially bonded manner via first weld sections 36, wherein the first weld sections 36 may be designed as laser-welded joints.

The first weld sections 36 extend substantially parallel to the first conveying channels 26 and are arranged in each case between the first conveying channels 26, usually in a region 37 that extends between two adjacent conveying channels 26. For instance, the region 37 may extend between the inner edge 16 and the sealing bead 12.

Therefore, while the weld sections 28 in FIGS. 3A-C are oriented approximately perpendicular to the conveying channels 26, according to the present disclosure they are oriented substantially parallel to the conveying channels 26 and perpendicular to the inner edge 16. The first weld sections 36 ensure that the individual plates 2a, 2b bear against each other in the edge region of the through-opening 11 and can no longer diverge from each other there. Hereinbelow, reference will sometimes be made to a single weld section 36 as representative of a plurality of first weld sections 36.

The region 37 may comprise three sub-regions, which extend substantially parallel to the first conveying channels 26. The three sub-regions may comprise a first lateral sub-region, a second middle sub-region, and a third lateral sub-region, wherein the lateral sub-regions typically adjoin the first conveying channels 26 in each case. The first weld sections 36 may in each case be arranged, for example, in the middle sub-region or alternatively in at least one of the two lateral sub-regions. However, they may also be arranged in both lateral sub-regions or even in all three sub-regions. Since the conveying channels 26 often have a straight course, the first weld sections 36 may be formed by straight weld sections.

The first weld sections 36 are often at a smaller distance from the inner edge 16 than from the sealing bead 12, such as the nearest bead foot 35 of the sealing bead 12. The respective distance from one element to the next element will be understood here to mean the minimum distance between the elements. The respective first weld section 36 has one end 36a facing towards the inner edge and one end 36b facing towards the sealing bead 12 and therefore facing away from the inner edge 16. As can be seen from FIGS. 4-11, for example, the end 36a facing towards the inner edge 16 often reaches closer to the inner edge 16 than the end 36b of the respective first weld section 36 facing away from the inner edge 16 reaches to a nearest bead foot 35 of the sealing bead 12. It may be provided that the end 36b of the respective first weld section 36 facing towards the nearest bead foot 35 is at a distance from the bead foot 35 of no less than 0.2 mm, such as no less than 0.3 mm.

In some embodiments, the first weld sections 36 are spaced apart from the inner edge 16, cf. FIG. 4, 6, 12-14. In this case, therefore, the end 36a is at a distance from the inner edge 16. In some embodiments, the first weld sections 36 reach to the inner edge 16, cf. for example the first weld sections 36 in FIGS. 5, 7-11. In this case, the end 36a and the inner edge 16 coincide, or the end 36a adjoins the inner edge 16.

At least one first weld section 36 may be provided in the region 37 between two adjacent first conveying channels 26, cf. FIGS. 4-7. It is also possible for at least two first weld sections 36 to be arranged in the region 37 between two adjacent first conveying channels 26, cf. FIGS. 5-7. The number of first weld sections 36 between two adjacent conveying channels 26 may depend on the space available and on the need to securely connect the individual plates 2a, 2b to each other in the region 37.

A length of the respective first weld section 36 may be, for example, greater than 1.0, greater than 1.5 mm, or greater than 2.0 mm. As can be seen from FIGS. 4-7, the weld sections 36 may vary in length. If the sealing bead 12 has a concave course locally, the separator plate 2 has more space for a weld section 36 in this region 37, so that the length of the first weld section 36 in this region is greater than in a region 37 of the separator plate 2 where the sealing bead 12 has a convex course. In addition, a width of the first weld sections 36—e.g. a width of each of the first weld sections 36—may be, for example, in the range 20 µm-200 µm.

Figure 10:
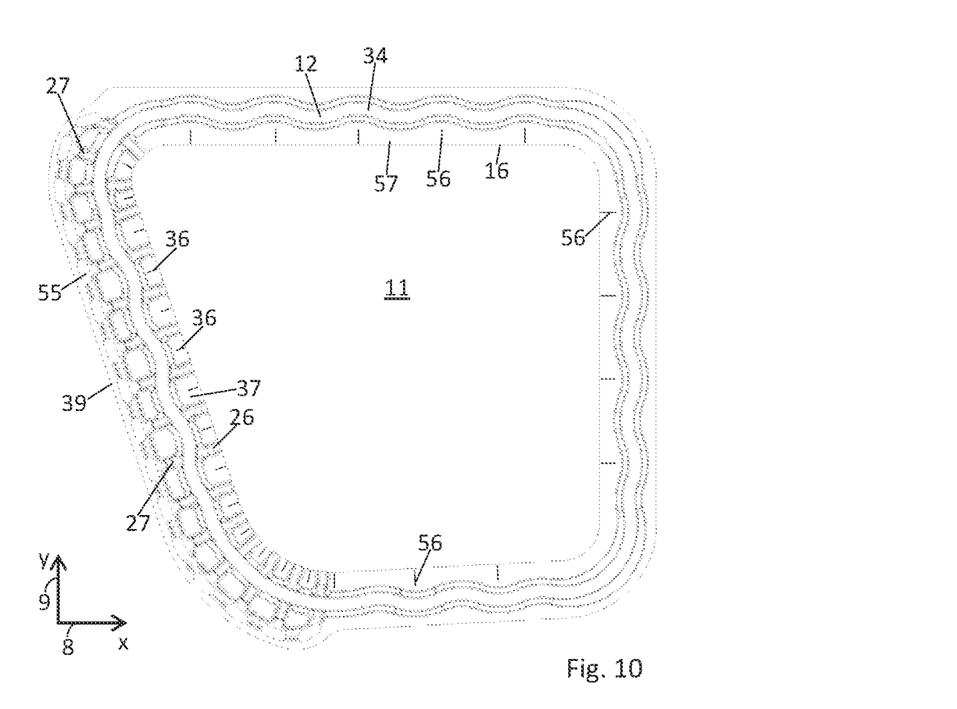
FIG. 10 shows a through-opening of a separator plate according to one embodiment, in a plan view.
Figure 11:
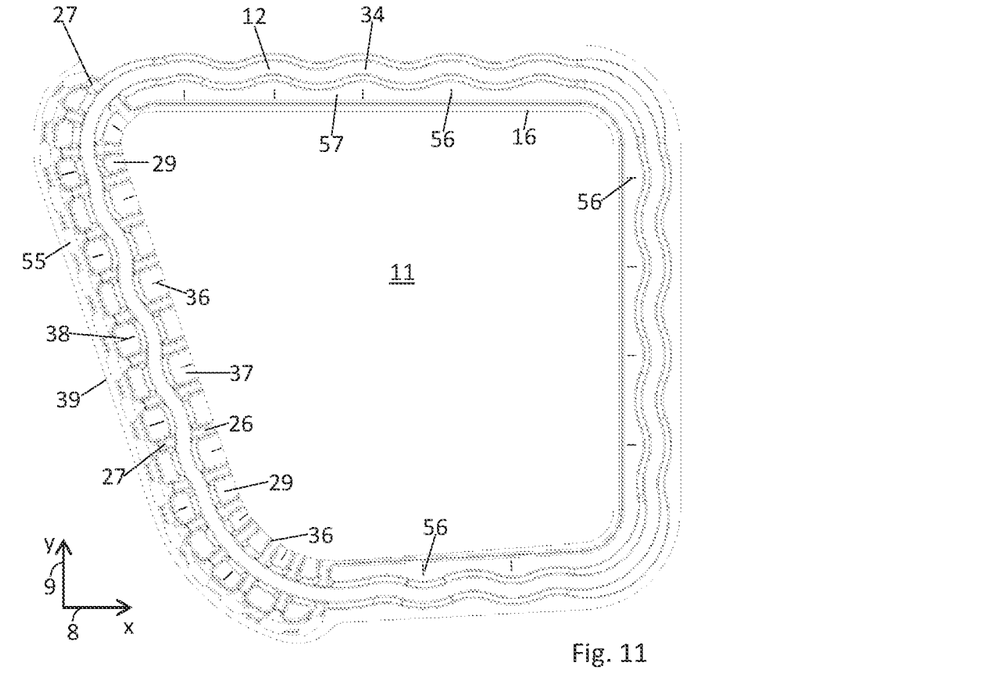
FIG. 11 shows a through-opening of a separator plate according to another embodiment, in a plan view.
Figure 12:
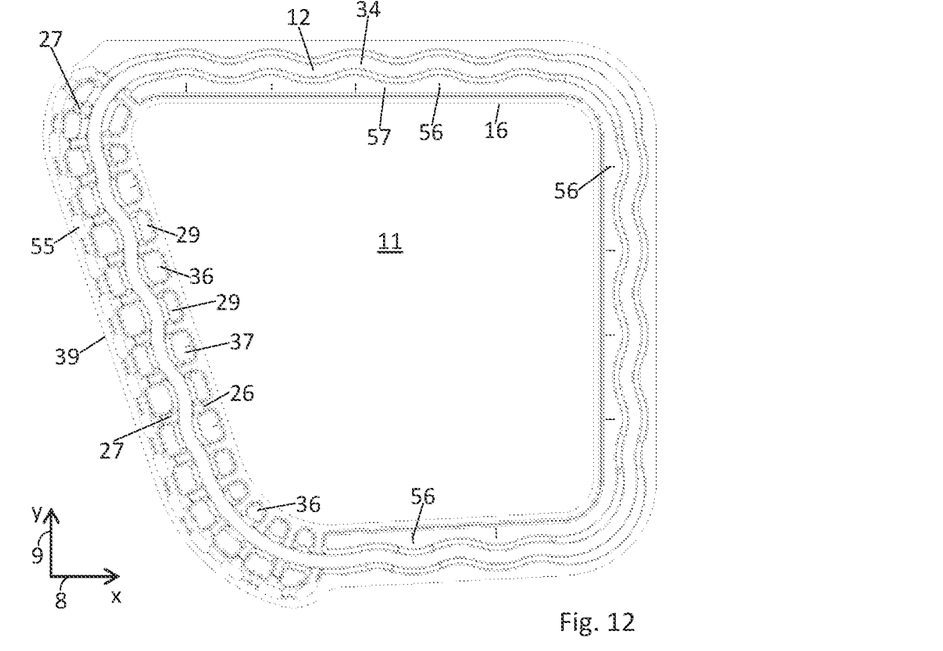
FIG. 12 shows a through-opening of a separator plate according to another embodiment, in a plan view.

As already noted above, the first weld sections 36 extend substantially parallel to the first conveying channels 26. Here, the indication "substantially" is intended to illustrate that minor deviations from parallelism of at most 25°, or at most 15°, or at most 10°, may occur. For instance, FIG. 7 shows, in the second example from the right, two weld sections 36 which are at an angle of 5° to the first conveying channels 26. The other first weld sections shown in FIGS. 4-7 extend parallel to the first conveying channels 26 and are also usually oriented substantially perpendicular to the inner edge 16. In the context mentioned above, deviations from parallelism occur, for example, if the first conveying channels 26 nearest to each other do not extend parallel to each other, as can be seen in FIGS. 10-12.

As likewise noted above, other minor deviations from parallelism may also be encompassed by "substantially parallel". The second example from the left in FIG. 7 shows rounded transitions between the first and second weld section 36,38, in which deviations from a straight line parallel to the first conveying section 26 occur over less than 15% of the length of a first and/or second weld section. The example on the far left in FIG. 7 additionally shows a curved first weld section 36, the extension of which in the width direction is less than 15% of the extension thereof in the direction parallel to the adjacent first conveying sections 26.

The separator plate 2 may additionally have a plurality of second weld sections 38 for connecting the two individual plates 2a, 2b. The second weld sections 38 may usually be oriented at an angle, such as perpendicularly, to the first weld sections 36 and are arranged in each case between the first conveying channels 26, usually likewise in the region 37. If present, the second weld sections are usually arranged in the same regions 37 between the first conveying channels 26 as the first weld sections 36. An angle between the respective first weld section 36 and the second weld section 38 is, for example, 70° or more and/or 110° or less.

Figure 4:
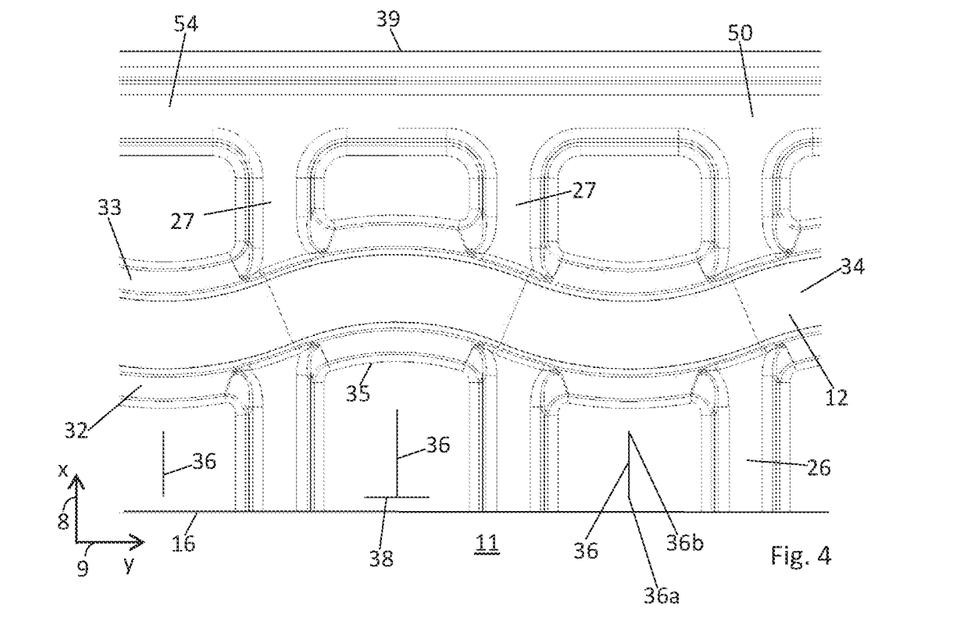
FIG. 4 shows a group of bead passages according to one embodiment, in a plan view.
Figure 5:
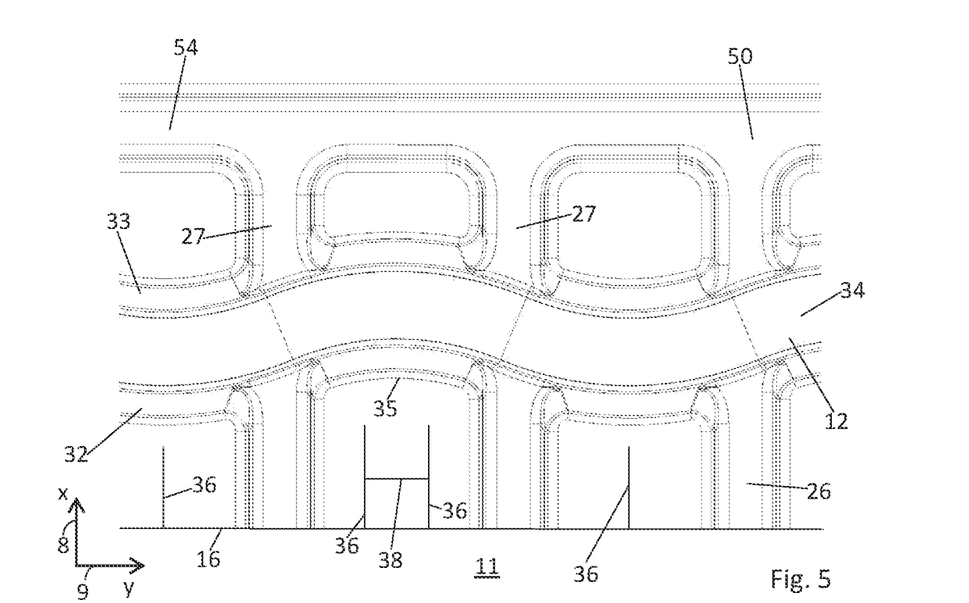
FIG. 5 shows a group of bead passages according to another embodiment, in a plan view.
Figure 6:
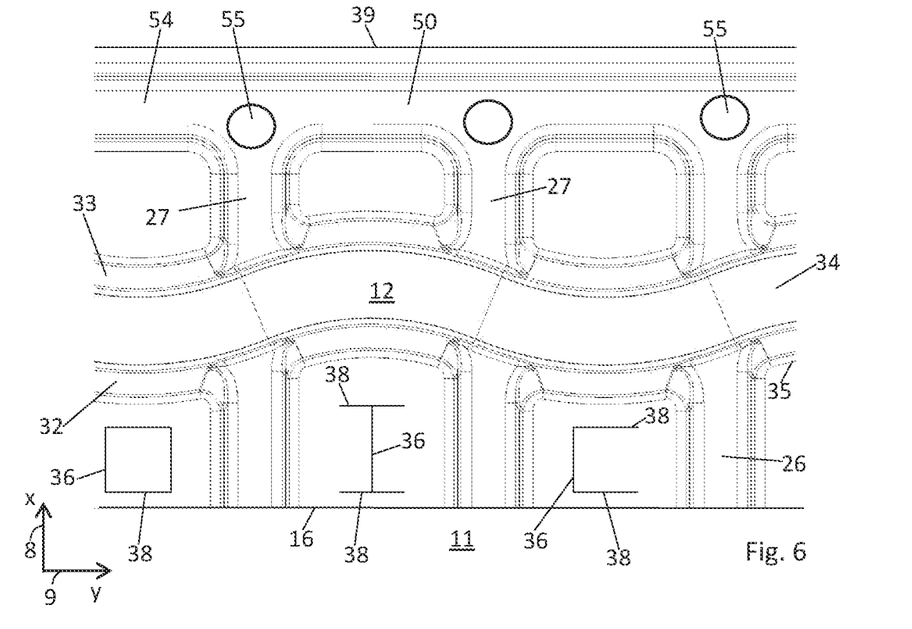
FIG. 6 shows a group of bead passages according to another embodiment, in a plan view.
Figure 7:
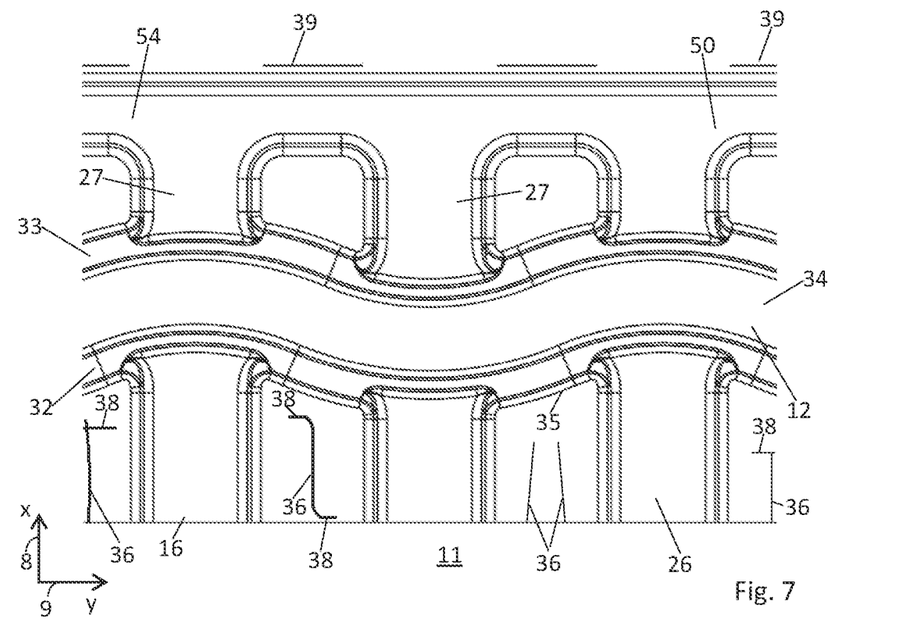
FIG. 7 shows a group of bead passages according to another embodiment, in a plan view.

The second weld sections 38 may adjoin the first weld sections 36, cf. FIGS. 4-6, or may cross the first weld sections 36, cf. FIG. 7. The first and the second weld section may also merge into each other via a short round section. In FIGS. 4, 5 and 7, there is at most one second weld section 38 between adjacent conveying channels 26. FIG. 6 shows that there may be, for example, two second weld sections 38 in the region 37 between adjacent conveying channels 26. If necessary, it is also possible for more than two weld sections 38 to be present in the respective region 37.

The at least one first weld section 36 and at least one second weld section 38 may together form a composite weld, which may have different shapes. For instance, the weld sections 36, 38 form a T-shaped (FIGS. 4, 7), an H-shaped (FIGS. 5, 6, can also be referred to as I-shaped when rotated), C-shaped (FIG. 6, can also be referred to as U-shaped when rotated), rectangle-shaped or square-shaped (FIG. 6), cross-shaped (FIG. 7, can also be referred to as +-shaped) or L-shaped weld. Other shapes and orientations are also conceivable.

The second weld sections 38 are spaced apart from the inner edge 16, wherein a minimum distance of the second weld sections 38 from the inner edge 16 is usually in each case at least 0.2 mm, or 0.3 mm. The second weld sections 38 may be oriented parallel to the inner edge; in this case, the distance thereof from the inner edge 16 is constant.

The respective first weld sections 36 and/or the second weld sections 38 may comprise laser-welded joints. The number of first weld sections 36 may be greater than or less than or equal to the number of first conveying channels 26. The number of second weld sections 38 may be greater than or less than or equal to the number of first conveying channels 26 and/or the number of first weld sections 36. Sometimes the first weld sections 36 and/or the second weld sections 38 are arranged centrally between the adjacent conveying channels 26.

There may also be regions between adjacent conveying channels in which no weld sections 36, 38 are provided, cf. regions 29 in FIGS. 10-12. The regions 37 containing the weld sections 36, 38 and the regions 29 without weld sections often alternate with each other e.g. are arranged in an alternating fashion.

In some embodiments (cf. FIGS. 4-7, 10-12), optionally a plurality of second conveying channels 27 are provided, which adjoin the second bead flank 33 of the sealing bead 12 and are in fluid connection with the sealing bead interior 31. The electrochemically active region 18 and the sealing bead interior 31 are fluidically connected to each other via the second conveying channels 27. It should be noted here that the above-mentioned distribution and/or collection region 20 may optionally still be arranged between the electrochemically active region 18 and the second conveying channels 27. In this case, the fluid connection between the electrochemically active region 18 and the sealing bead interior 31 comprises the second conveying channels 27 and the distribution and/or collection region 20. Additional connecting sections may sometimes also be provided in the fluid connection.

In some embodiments, the second conveying channels 27 are fluidically connected to the electrochemically active region 18 via at least one aperture 55 formed in the separator plate 2. In other embodiments, the through-opening 11 in question is designed as a through-opening 11*b*, 11*c* for reaction media, such as reaction gas. The at least one aperture 55 is, or the apertures 55 may be formed in the same individual plate 2*a*, 2*b* as the second conveying channels 27. In some embodiments, only one of the individual plates 2*a*, 2*b* has apertures 55 at a through-opening, whereas both individual plates 2*a*, 2*b* have second conveying channels 27. It may be provided that the number of apertures 55 is equal to the number of second conveying channels 27.

The apertures 55 may be designed as cutouts and/or punched holes and can accordingly be formed by cutting and/or punching the plate 2 or the individual plates 2*a*, 2*b*.

In some embodiments, at least one auxiliary bead 40, 50 may be provided, which is fluidically connected to the conveying channels 26 or 27. For instance, the separator plates 2 of the embodiments in FIGS. 4-14 have at least one auxiliary bead 40, 50, which is fluidically connected to the conveying channels 26, 27. As a result, the apertures 55 are spaced apart from the actual conveying channels 26, 27. Often this type of auxiliary bead 40, 50 is not associated with a function of sealing off the through-opening 11. When the stack 6 is compressed in the stacking direction, the respective auxiliary bead 40, 50 may be spaced apart from the frame of a membrane electrode assembly 10 or may bear against the frame of the membrane electrode assembly 10, depending on the selected height of the auxiliary bead 40, 50. It should be noted that the auxiliary beads 40, 50 may also be omitted in some embodiments.

The first auxiliary bead 40 (cf. FIGS. 12-14) usually has a bead flank 43 facing towards the sealing bead 12, wherein the first conveying channels 26 adjoin the bead flank 43 of the first auxiliary bead 40 and are in fluid connection with the first auxiliary bead interior 41. The first conveying channels 26 extend from the first auxiliary bead 40 to the sealing bead 12, more specifically from the bead flank 43 of the first auxiliary bead 40 to the first bead flank 32 of the sealing bead 12. By way of example, the first auxiliary bead 40 is designed as a half-bead.

A maximum height of the first auxiliary bead 40, determined perpendicular to a flat surface plane of the separator plate 2, is typically smaller than a corresponding maximum height of the sealing bead 12. Unlike the sealing bead 12, the first auxiliary bead 40 is usually not compressed in the compressed state of the separator plate 2.

In some embodiments, the first auxiliary bead 40 extends all the way around the through-opening 11, cf. FIG. 12. In other embodiments, the first auxiliary bead 40 is provided only in a region where the first conveying channels 26 are not provided (FIG. 11). In other embodiments, a first auxiliary bead 40 may also be omitted entirely (FIG. 10).

The second auxiliary bead 50 (cf. FIGS. 4-12) usually comprises a second auxiliary bead interior 51, a first bead flank 52 facing towards the sealing bead 12, and a second bead flank 53 facing away from the sealing bead 12, wherein the second conveying channels 27 adjoin the first bead flank 52 of the second auxiliary bead 50 and are in fluid connection with the second auxiliary bead interior 51. The second conveying channels 27 extend from the second auxiliary bead 50 to the sealing bead 12, more specifically from the first bead flank 52 of the second auxiliary bead 50 to the second bead flank 33 of the sealing bead 12. The bead flanks 52, 53 are connected to each other by a bead top 54. In addition, the second auxiliary bead 50 is designed as a full bead.

A maximum height of the second auxiliary bead 50, determined perpendicular to a flat surface plane of the separator plate 2, is typically smaller than a corresponding maximum height of the sealing bead 12. Unlike the sealing bead 12, the first auxiliary bead 50 is usually not compressed in the compressed state of the separator plate 2.

Embodiments of the second auxiliary bead 50 is usually provided only in a region in which the second conveying channels 27 are arranged, cf. FIGS. 10-12. This region usually extends fluidically between the conveying channels 27 and the flow field 17 or the electrochemically active region 18 or the distribution and collection region 20. An arrangement between these elements may occur in many embodiments, but is not mandatory. If the second auxiliary bead 50 is provided, the number of apertures 55 may be less than, equal to or greater than the number of second conveying channels 27. The weld 39, if present, is usually arranged on a side of the second auxiliary bead 50 remote from the sealing bead 12. Such a weld 39 may be formed at through-openings 11 for reactants as a continuous sealing line, as shown in FIGS. 4, 6 and 10-12. Such a weld 39 may not be present at through-openings 11 for coolants, as in FIG. 5, or in a non-sealing embodiment may be implemented, for example, as weld lines spaced apart from each other, as in FIG. 7.

The auxiliary beads 40, 50 optionally extend parallel to each other. For instance, both auxiliary beads 40, 50 have the same height. Furthermore, the first auxiliary bead 40, the second auxiliary bead 50, the inner edge 16 of the through-opening 11 and/or a main direction of extension of the sealing bead 12 may extend at least in part in a parallel manner. The conveying channels 26, 27 and/or the first weld sections 36 may be oriented at an angle to the weld 39, to the first auxiliary bead 40, to the second auxiliary bead 50 and/or to the main direction of extension of the sealing bead 12, for instance at an angle of at least 65° and/or at most 115°, such as around 90°. The selected angle may depend on the space available.

The sealing bead 12, the conveying channels 26, 27 and the auxiliary beads 40, 50 are usually integrally formed in the respective individual plate 2a, 2b, for example by embossing, hydroforming or deep-drawing. The sealing bead 12, the conveying channels 26, 27 and the auxiliary beads 40, 50 are thus an integral part of the respective separator plate 2a, 2b.

The through-opening 11 may have different shapes, for example polygonal with rounded corners (FIGS. 10-12) or round (FIG. 2); more complex shapes are also possible.

The sealing bead 12 may have at least in part a wavy, curved, round or straight course. The sealing beads 12 in FIGS. 4-12 each have a wavy course. The wavy sealing bead 12 has alternating concave sections and convex sections, which in each case merge into each other at a turning point. A main direction of extension of the sealing bead 12 then results from the line connecting the turning points of the neutral axis of the sealing bead 12. The main direction of extension of the sealing bead 12 may extend at least in part parallel and/or concentric to the first auxiliary bead 40, the second auxiliary bead 50 and the inner edge 16, cf. FIGS. 4-12. The bead flanks 32, 33 of the sealing bead 12 are often shaped in a complementary manner, e.g. if the first bead flank 32 is convex in one section, the second bead flank 33 is concave in this section, and vice versa.

In the embodiments of FIGS. 4-6 and 10-12, the conveying channels 26, 27 are arranged at the turning points of the wavy course of the sealing bead 12 or adjoin the turning points. Alternatively, the conveying channels 26, 27 may be arranged alternately at the convex and/or the concave sections of the wavy shape, as shown in FIG. 7.

When the conveying channels 26 are arranged in the region of the turning points, the respective weld sections 36, 38 may each face towards a concave section of the sealing bead 12 and/or a convex section of the sealing bead 12, as shown in FIGS. 4-6 and 10-12. When the conveying channels 26 are arranged in the convex and/or concave sections of the wavy shape, as in FIG. 7, the respective weld sections 36, 38 may each face towards a turning point of the sealing bead 12.

Figure 13:
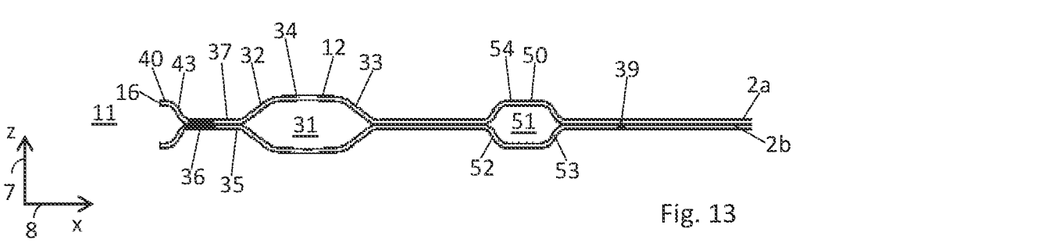
FIG. 13 shows a sectional view between two bead passages of FIG. 12 in a non-compressed state of the separator plate.
Figure 14:
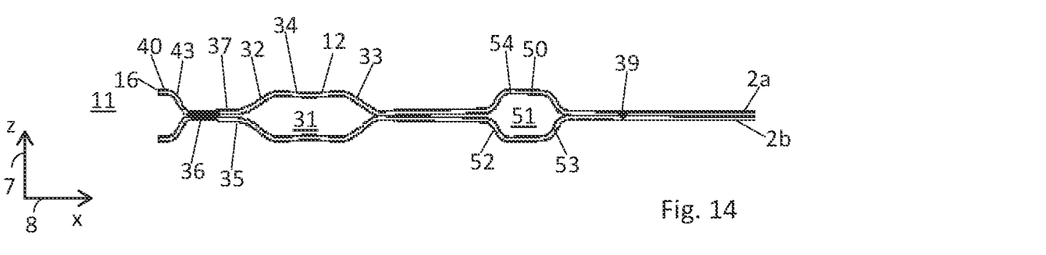
FIG. 14 shows a sectional view between two bead passages of FIG. 12 in a compressed state of the separator plate.

FIG. 12 shows, in a plan view, a through-opening 11 and a sealing bead 12 arranged around the through-opening; FIG. 13 shows a sectional view between the conveying channels 26 of FIG. 12. FIGS. 12 and 13 show a non-compressed state of the separator plate 2. In addition, FIG. 14 shows the same sectional view as FIG. 13, but in a compressed state of the separator plate 2. By comparing the separator plate of FIGS. 12-14 with the separator plate 2 of FIGS. 3A-3C according to the prior art, it can be seen that the perpendicular weld sections 36 in FIGS. 12-14 are arranged at a smaller distance from the inner edge 16 than the horizontal welded joints 28. In addition, the individual plates 2a, 2b in FIGS. 12-14 bear against each other in the region of their inner edges 16 and are not spaced apart from each other in the region of their inner edges 16 as in FIGS. 3A-3C. Overall, the inner edges 16 of the individual plates 2a, 2b present no risk or a reduced risk of a short-circuit in the compressed state of the separator plate 2.

Figure 8:
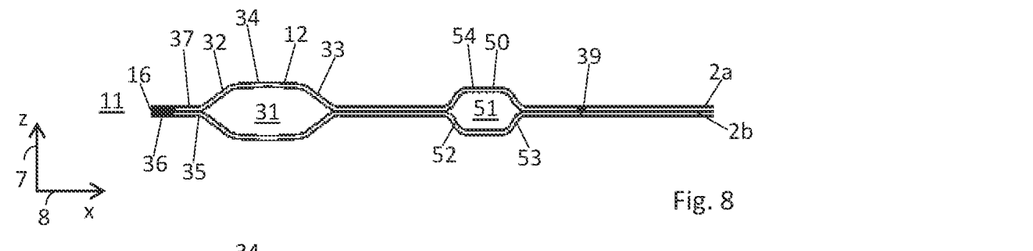
FIG. 8 shows a sectional view between two bead passages in a non-compressed state of the separator plate.
Figure 9:
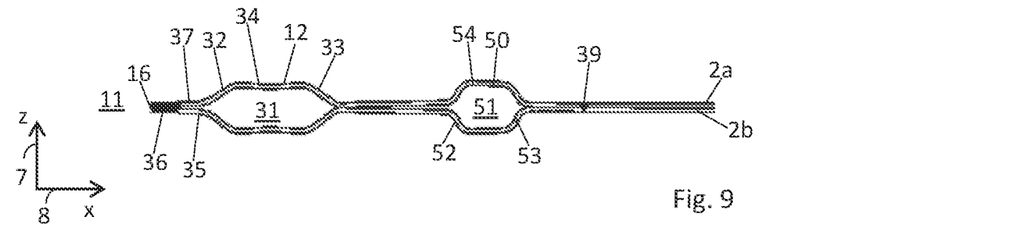
FIG. 9 shows a sectional view between two bead passages in a compressed state of the separator plate.

Similarly to FIGS. 13 and 14, FIGS. 8 and 9 each show a sectional view between the conveying channels 26 of one of FIGS. 5, 7, 10-11, the section extending through the first weld section 36 adjoining the inner edge 16. FIG. 8 shows a non-compressed state of the separator plate 2. FIG. 9 shows the same section as FIG. 8, but in a compressed state of the separator plate 2. Here, too, it can be seen that the inner edges 16 are securely connected to each other and bear against each other as a result of the first weld sections 36.

In the embodiments of FIGS. 10-12, additional weld sections 56 are also provided, which extend substantially perpendicular to the inner edge 16. These additional weld sections 56 may be arranged at regular intervals around the through-opening 11. They may have the same properties as the first weld sections in terms of shape, size, orientation and distance from the sealing bead 12 and/or inner edge 16, but they are located not between two adjacent conveying channels 26 but rather in a section 57 between the sealing bead 12 and the inner edge 16 in which no bead passages 25' are arranged.

In all the embodiments, the second individual plate 2b may have the same features as the first individual plate 2a, it being possible for the features to be formed at different through-openings of each individual plate. At least in some regions, therefore, in the region of the bead passage 25', the separator plate 2 may be constructed in a mirror-symmetrical manner with regard to the embossed structures, but not with regard to the apertures 55, wherein the mirror plane extends parallel to a flat plate plane of the separator plate 2 and between the two individual plates 2a, 2b.

FIGS. 1-14 are shown approximately to scale. FIGS. 1-14 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" or "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A separator plate for an electrochemical system, comprising a first individual plate and a second individual plate, which are connected to each other, wherein at least the first individual plate comprises:
   an electrochemically active region,
   at least one through-opening for the passage of a fluid, having an inner edge that bounds the through-opening,
   a sealing bead arranged around the through-opening for sealing off the through-opening, wherein the sealing bead has a sealing bead interior, a first bead flank facing towards the through-opening, and a second bead flank,
   a plurality of first conveying channels, which adjoin the first bead flank of the sealing bead, are in fluid connection with the sealing bead interior and extend from the sealing bead in the direction of the through-opening, wherein the through-opening and the sealing bead interior are fluidically connected to each other via the first conveying channels, and
   a plurality of first weld sections for connecting the two individual plates, which first weld sections extend substantially parallel to the first conveying channels and are arranged in each case between the first conveying channels.

2. The separator plate according to claim 1, wherein an end of the respective first weld section facing towards the inner edge reaches closer to the inner edge than an end of the respective first weld section facing away from the inner edge reaches to a nearest bead foot of the sealing bead.

3. The separator plate according to claim 2, wherein the end of the respective first weld section facing towards the nearest bead foot is at a distance from the bead foot of no less than 0.2 mm.

4. The separator plate according to claim 1, wherein the first weld sections reach to the inner edge.

5. The separator plate according to claim 1, wherein at least two of the first weld sections are arranged between two adjacent first conveying channels.

6. The separator plate according to claim 1, wherein a length of the first weld sections is greater than 1.0 mm.

7. The separator plate according to claim 1, comprising a plurality of second weld sections for connecting the two individual plates, which second weld sections are oriented at an angle to the first weld sections and are arranged in each case between the first conveying channels.

8. The separator plate according to claim 7, wherein at least one of the second weld sections crosses one of the first weld sections and/or adjoins one of the first weld sections.

9. The separator plate according to claim 7, wherein at least two second weld sections are arranged between two adjacent first conveying channels.

10. The separator plate according to claim 7, wherein at least one of the first weld sections and at least one of the second weld sections together form a T-shaped, cross-shaped, L-shaped, rectangularly shaped, H-shaped or approximately U-shaped or C-shaped weld.

11. The separator plate according to claim 7, wherein a minimum distance of the second weld sections from the inner edge is in each case at least 0.2 mm.

12. The separator plate according to claim 1, wherein the sealing bead has at least in part a wavy course, wherein the wavy course has a plurality of wave periods with convex and concave sections, which in each case merge into each other at a turning point, wherein the respective weld sections in each case face towards a concave section of the sealing bead and/or a convex section of the sealing bead.

13. The separator plate according to claim 1, wherein the sealing bead has at least in part a wavy course, wherein the wavy course has a plurality of wave periods with convex and concave sections, which in each case merge into each other at a turning point, wherein the respective weld sections in each case at least approximately face towards a turning point of the sealing bead.

14. The separator plate according to claim 1, comprising a plurality of second conveying channels, which adjoin the second bead flank of the sealing bead and are in fluid connection with the sealing bead interior, wherein the electrochemically active region and the sealing bead interior are fluidically connected to each other via the second conveying channels.

15. The separator plate according to claim 14, wherein the second conveying channels are fluidically connected to the electrochemically active region via at least one aperture formed in the separator plate.

16. The separator plate according to claim 1, wherein the respective weld sections comprise laser-welded joints.

* * * * *